(No Model.)
J. H. LANE.
PIPE COUPLING.
No. 509,743. Patented Nov. 28, 1893.
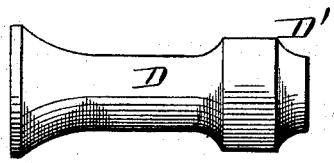
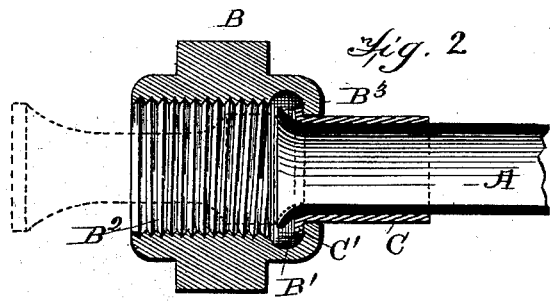
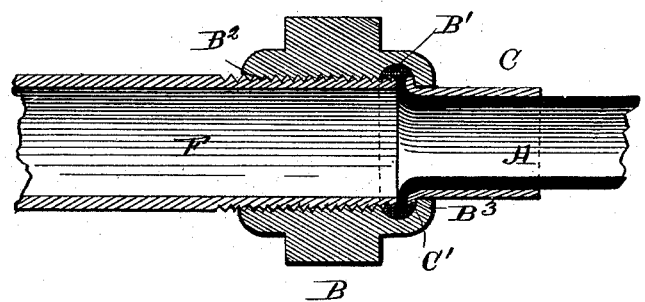
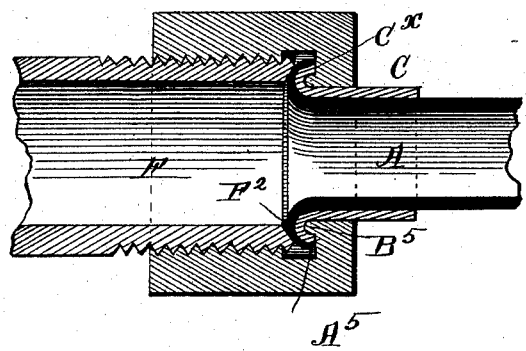
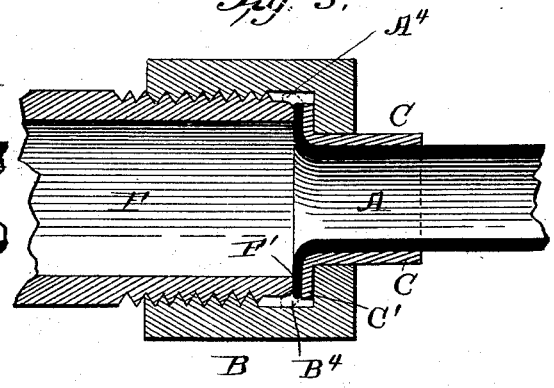
Witnesses
O. W. Johnson
C. K. Davies.
Inventor
J. H. Lane
By L. B. Coupland & Co.
Attorneys

UNITED STATES PATENT OFFICE.

JAMES H. LANE, OF CHICAGO, ILLINOIS, ASSIGNOR OF ONE-HALF TO HENRY B. CHICHESTER, OF SAME PLACE.

PIPE-COUPLING.

SPECIFICATION forming part of Letters Patent No. 509,743, dated November 28, 1893.

Application filed May 2, 1893. Serial No. 472,685. (No model.)

*To all whom it may concern:*

Be it known that I, JAMES H. LANE, residing at Chicago, in the county of Cook and State of Illinois, have invented certain new and useful Improvements in Pipe-Couplings, of which the following is a specification, reference being had therein to the accompanying drawings.

This invention relates to joints for pipes.

The object of the invention is to produce a pipe joint by which a soft metal pipe section may be coupled to a hard metal section, so as to make a tight joint without solder.

The principal use of the coupling at present is in setting of gas meters.

Figure 1 is an elevation of the tool or swage used in expanding the soft metal pipe. Fig. 2 is a section of the metallic coupling sleeve, a portion of the lead or soft metal pipe entering the same, and the bushing, and showing the swage in dotted lines. Fig. 3 is a longitudinal section of the coupled joint. Fig. 4 is a section of a modified coupling, and Fig. 5 is a section of another modification.

In each of the figures where the pipe is shown, A indicates a section of soft metal pipe, usually lead pipe. Such pipe section is generally used near gas meters, as it can readily be bent to position to make convenient connections.

In making my coupling or connection, I first pass the coupling sleeve or union joint piece B over the end of the lead pipe. The hard metal thimble or bushing C is then slipped over the end of the pipe, until the lead pipe projects slightly from the flanged end of this bushing. The swage D then has its expanding head D' entered into the open end of the lead pipe, and is driven into said pipe. This has the effect of spreading the end of the lead pipe over the flanged end C' of the thimble or bushing. The coupling sleeve B may be brought over the end of the lead pipe while this swaging is performed, or afterward, as desirable.

The coupling sleeve B has an interior chamber B', preferably of greater diameter than the screw threaded portion B² of the sleeve. This chamber B' is not threaded. In other respects the sleeve B does not differ materially from the ordinary metallic coupling sleeve or nut. It has preferably a polygonal outer surface for the application of a wrench, and is screw threaded internally for most of its length. The inturned edge B³ extends behind the flange C' on the thimble. When the soft metal pipe A has been expanded, as in Fig. 2, the swage is withdrawn, and the hard metal pipe section F enters the sleeve, having screw threaded engagement therewith. As the sleeve is turned to draw the parts together, the end of the pipe A comes in contact with the end of the pipe F and is still further expanded outwardly, as in Fig. 3, the end of pipe F closing close against the end of the lead pipe, and the recess B' permitting the soft metal of pipe A to flow or bend outwardly.

If the interior of the chamber B' of the sleeve were screw threaded, it would mutilate and abrade the end of pipe A, when such pipe expanded outward against said threaded walls; but by making the walls of recess B' smooth, this objection is avoided. The pipe F can close tightly against the expanded end of pipe A, and the latter pipe can be turned out close against the walls of the recess B', making smooth and close contact in each case.

In Fig. 4 the recess B⁴ is shown to be cylindrical, and the end F' of pipe F has its outer corner rounded or beveled. Then if the pressure is sufficient the soft metal pipe A may be expanded around the end of pipe F as indicated in dotted lines at A⁴, tending to close the joint still more closely.

The modification shown in Fig. 4 shows the end F² of pipe F concaved. Then when the parts are brought together the soft metal pipe can be turned back, as at A⁵. The flange Cˣ of thimble C may be rounded to facilitate this expansion, and the sleeve B may have an inturned annulus B⁵ to still further close the joint.

From the foregoing it will be understood that the joint is in part made of the contact of the hard metal pipe F with the soft metal pipe within the sleeve, whereby the soft metal pipe is expanded into the smooth recess of the sleeve.

What I claim is—

1. In pipe joints, a coupling sleeve having an internal screw thread for a part of its length, a chamber or recess of greater diameter than the screw threaded portion and adjacent thereto, the inturned end of said sleeve next said chamber extending inward to leave an opening of less diameter than the screw threaded portion, and the soft metal pipe, hard metal thimble, and hard metal line pipe joined within said sleeve, all combined substantially as described.

2. The pipe joint or coupling described, consisting essentially of the soft metal pipe connection, the hard metal thimble about the same, and having projecting flanges in contact, the screw threaded sleeve having a smooth chamber into which said flanges project, and the hard metal pipe section engaging with the sleeve and projecting against the soft metal flange within the smooth chamber, all substantially as described.

In testimony whereof I affix my signature in presence of two witnesses.

JAMES H. LANE.

Witnesses:
A. P. CONOLLY,
L. B. COUPLAND.